United States Patent [19]

Noll et al.

[11] 4,092,286

[45] May 30, 1978

[54] PRODUCTION OF WATER-DISPERSIBLE POLYURETHANES HAVING IONIC GROUPS AND HYDROPHILIC SIDE CHAINS

[75] Inventors: Klaus Noll, Cologne; Jürgen Grammel, Dormagen; Walter Meckel, Neuss, all of Germany

[73] Assignee: Bayer Aktiengesellschaft, Leverkusen, Germany

[21] Appl. No.: 741,818

[22] Filed: Nov. 15, 1976

[30] Foreign Application Priority Data

Nov. 14, 1975 Germany .............................. 2551094

[51] Int. Cl.$^2$ ...................... C08L 75/08; C08G 18/77
[52] U.S. Cl. .............................. 260/29.2 TN; 8/115.6; 8/192; 156/331; 260/37 N; 260/77.5 Q; 260/859 R; 260/DIG. 18; 427/385 R; 428/424; 428/425; 526/1
[58] Field of Search .................. 260/77.5 Q, 77.5 AQ, 260/75 NQ, 29.2 TN

[56] References Cited

U.S. PATENT DOCUMENTS

| | | | |
|---|---|---|---|
| 3,479,310 | 11/1969 | Dieterich et al. | 260/29.2 TN |
| 3,879,450 | 4/1975 | Velker et al. | 260/29.2 TN |
| 3,905,929 | 9/1975 | Noll | 260/29.2 TN |
| 3,920,598 | 11/1975 | Reiff et al. | 260/29.2 TN |
| 3,971,764 | 7/1976 | Schurmann et al. | 260/77.5 Q |

OTHER PUBLICATIONS

Dieterich et al., J. Oil Col. Chem. Assoe., 1970, 53, 363-379.
DOS 2,314,152, Oct. 17, 1974, Bayer A/G, (Noll).
DOS 2,314,513, Oct. 3, 1974, Bayer A/G, (Reiff).

*Primary Examiner*—H.S. Cockeram
*Attorney, Agent, or Firm*—Gene Harsh; Lawrence S. Pope; Frederick H. Colen

[57] ABSTRACT

The present invention relates to water-dispersible polyurethane elastomers having a substantially linear molecular structure, characterized by (a) lateral polyalkylene oxide polyether chains having a content of ethylene oxide units of from about 0.5 to 10% by weight, based on the polyurethane as a whole and (b) a content of $=N^{\oplus}=$, $-COO^{\ominus}$ or $-SO_3^{\ominus}$ groups of from about 0.1 to 15 milliequivalents per 100 g, to aqueous dispersions of these water-dispersible polyurethane elastomers and to processes for producing these water-dispersible polyurethane elastomers.

16 Claims, No Drawings

PRODUCTION OF WATER-DISPERSIBLE POLYURETHANES HAVING IONIC GROUPS AND HYDROPHILIC SIDE CHAINS

BACKGROUND OF THE INVENTION

Aqueous dispersions of polyurethanes or polyurethane ureas have long been known (cf. for example Angewandte Chemie, 82, (1970), pages 53 to 63; DT-OS Nos. 2,314,512 and 2,314,513 and U.S. Pat. Nos. 3,920,598 and 3,905,929) and have a high quality level.

Not least, the fact that many of these dispersions are free from emulsifiers contributes towards this high quality level. They contain chemically incorporated hydrophilic centers which impart self-emulsifiability to the otherwise hydrophobic elastomers. This method of producing self-emulsifiability has two principal advantages over the use of emulsifiers:

(1) less hydrophilic centers are required;

(2) the emulsifier incorporated is unable to migrate from shaped articles produced from elastomer dispersions of this type; as a rule, behavior of this type has a considerable effect upon the property spectrum.

The first feature, in particular, considerably reduces the sensitivity to water of shaped articles produced from self-emulsified polyurethanes. The hydrophilic centers incorporated into known water-dispersible polyurethanes and polyurethane ureas may represent both salt-like, i.e. ionic groups, and also hydrophilic non-ionic groups.

The "polyurethane ionomers" include both chemically fixed cations, i.e., in particular, polyurethanes containing chemically incorporated ammonium ions, and also chemically fixed anions, i.e., in particular, polyurethanes containing chemically incorporated sulphonate or carboxylate groups. The non-ionic, water-dispersible polyurethanes include, in particular, the polyurethanes and polyurethane ureas containing lateral polyethylene oxide chains according to DT-OS Nos. 2,314,512 and 2,314,513 and U.S. Pat. Nos. 3,920,598 and 3,905,929.

Dispersions of these polyurethanes have different, characteristic property spectra, depending upon the type of hydrophilic center. Thus, polyurethane ionomer dispersions remain stable when heated to temperatures up to their boiling point because the solubility of the salt groups present in them is virtually unaffected by temperature, whereas non-ionic dispersions coagulate when heated to only moderate temperatures (approximately 60° C), because the polyethylene oxide side chains gradually lose their solubility in water at elevated temperature. In contrast to ionomers, however, these dispersions are unaffected by the addition of virtually unlimited quantities of electrolytes and remain stable even after freezing and thawing.

The present invention provides new water-dispersible polyurethanes which, in the form of aqueous dispersions, combine the advantage of excellent resistance to frost and electrolytes with the advantage of very good temperature resistance. It has surprisingly been found that water-dispersible polyurethane elastomers of the type in question may be produced by incorporating into the polyurethane both hydrophilic side chains containing ethylene oxide units and also ionic groups. This is surprising because it was found that mixtures of aqueous dispersions of ionic and non-ionic polyurethanes do not show such a combination of desirable properties. On the contrary, mixtures of this type show above all the disadvantages of the individual constituents.

It was also surprisingly found that, by means of the combined incorporation of ionic and lateral non-ionic hydrophilic groups, the overall concentration of hydrophilic groups may be kept considerably lower than is possible where only ionic or non-ionic groups are incorporated without any adverse effect upon the physical property spectrum of the dispersions.

The particle size of the dispersed particles present in an aqueous polyurethane dispersion is closely related to the concentration of hydrophilic groups in the dispersed polyurethane. In general, the polyurethane dispersion is more finely divided, the higher the content of hydrophilic groups incorporated. For example, in order to produce a dispersion having an average particle diameter T, it is necessary to incorporate into the polyurethane to be dispersed a minimum content of $x$ percent, by weight, $-SO_3^{\ominus}$ or a minimum content of $y$ percent, by weight, of lateral polyethylene oxide units. Accordingly, a mixture of equal parts of both dispersions, for an average particle diameter T, would contain at least 0.5 $x$ percent, by weight, $-SO_3^{\ominus}$ and 0.5 $y$ percent, by weight, of lateral polyethylene oxide units, based on dispersed polyurethane. However, it was found in accordance with the present invention that, for example, where $-SO_3^{\ominus}$ and lateral polyethylene oxide units are simultaneously incorporated into an otherwise corresponding polyurethane, it is possible to produce polyurethane dispersions having a maximum average particle diameter T by incorporating much smaller quantities than 0.5 $x$ percent, by weight, $-SO_3^{\ominus}$ and 0.5 $y$ percent, by weight, of lateral polyethylene oxide units.

This has several advantages. Thus, the basically hydrophobic polyurethane has to be chemically modified to a far lesser extent. With the reduction in the number of hydrophilic centers, the tendency which coatings produced from polyurethane dispersions of the type in question have to absorb water and swell is reduced, as is the deterioration in mechanical strength in the moist state which may never be completely avoided in the case of dispersions. This is of considerable advantage, especially in cases where the polyurethane dispersions according to the present invention are used for the production of elastic coatings on textile substrates.

SUMMARY OF THE INVENTION

Accordingly, the present invention relates to water-dispersible polyurethane elastomers having a substantially linear molecular structure, characterized by:

(a) lateral polyalkylene oxide polyether chains having a content of ethylene oxide units of from about 0.5 to 10%, by weight, based on the polyurethane as a whole, and (b) a content of $=N^{\oplus}=$, $-COO^{\ominus}$ or $-SO_3^{\ominus}$ — groups of from about 0.1 to 15 milliequivalents per 100 g.

The present invention also relates to aqueous dispersions of these polyurethane elastomers.

Furthermore, the present invention also relates to a preferred process for producing the water-dispersible polyurethane elastomers according to the present invention having a substantially linear molecular structure by reacting organic diisocyanates with difunctional organic compounds (difunctional in the sense of the isocyanate polyaddition reaction) containing terminal isocyanate-reactive hydrogen atoms and having a molecular weight in the range of from about 300 to 6000 in the presence of synthesis components containing hydrophilic groups or groups convertible into hydrophilic groups which guarantee the dispersibility of the polyurethanes, the at least partial conversion of the second of the groups just mentioned into hydrophilic groups taking place during or after the polyaddition reaction, and optionally in the presence of the chain extenders known in polyurethane chemistry having a molecular weight below about 300 and optionally in the presence of the additives and aids normally used in polyurethane chemistry, distinguished by the fact that the synthesis components containing hydrophilic groups or groups convertible into hydrophilic groups used in accordance with the present invention are both:

(a) diisocyanates and/or difunctional compounds (in the sense of the isocyanate polyaddition reaction) having a molecular weight of from 550 to 4500 preferably of from 1200 to 3500 containing isocyanate-reactive hydrogen atoms and hydrophilic side chains containing ethylene oxide units, and (b) monoisocyanates or diisocyanates and/or monofunctional or difunctional compounds (in the sense of the isocyanate polyaddition reaction) having molecular weights of from 75 to 500 containing isocyanate-reactive hydrogen atoms and ionic groups or groups convertible into ionic groups, the quantity and type and degree of neutralization or quaternization of component (b) and the quantity and type of component (a) being such that the polyurethane ultimately obtained contains from about 0.5 to 10%, by weight, of ethylene oxide units incorporated into the side chains and from about 0.1 to 15 milliequivalents, per 100 g of polyurethane, of ionic groups.

DETAILED DESCRIPTION OF THE INVENTION

Organic diisocyanates suitable for use in the preferred process described above for producing the polyurethane elastomers according to the present invention are organic diisocyanates corresponding to the following general formula:

wherein R represents an organic radical of the type obtained by removing the isocyanate groups from an organic diisocyanate having a molecular weight in the range of from about 112 to 1000 and preferably in the range of from about 140 to 400.

Diisocyanates particularly preferred for the process according to the present invention are those corresponding to the above general formula, wherein R represents a difunctional aliphatic hydrocarbon radical having from 4 to 18 carbon atoms, a difunctional cycloaliphatic hydrocarbon radical having from 5 to 15 carbon atoms, a difunctional aromatic hydrocarbon radical having from 6 to 15 carbon atoms or an araliphatic hydrocarbon radical having from 7 to 15 carbon atoms.

Typical representatives of organic diisocyanates preferably used for the process according to the present invention are, for example, tetramethylene diisocyanate, hexamethylene diisocyanate, dodecamethylene diisocyanate, cyclohexane-1,3- and -1,4-diisocyanate, 1-isocyanato-3-isocyanato-methyl-3,5,5,-trimethyl cyclohexane, 4,4'-diisocyanato dicyclohexylmethane, or even aromatic diisocyanates, such as 2,4-diisocyanato toluene, 2,6-diisocyanato toluene, mixtures of these isomers, 4,4'-diisocyanato diphenyl methane, 1,5-diisocyanato and naphthalene.

Difunctional compounds (in the sense of the isocyanate polyaddition reaction) containing terminal isocyanate-reactive groups and having a molecular weight in the range of from about 300 to 6000, preferably from about 500 to 3000, which are suitable for use in accordance with the present invention are, in particular:

(1) the dihydroxy polyesters, known in polyurethane chemistry, of dicarboxylic acids, such as succinic acid, adipic acid, suberic acid, azelaic acid, sebacic acid, phthalic acid, isophthalic acid, terephthalic acid, tetrahydrophthalic acid, etc., and diols, such as ethylene glycol, 1,2-propylene glycol, 1,3-propylene glycol, diethylene glycol, 1,4-butane diol, 1,6-hexane diol, 1,8-octane diol, neopentyl glycol, 2-methyl-1,3-propane diol, or the various isomeric bis-hydroxymethyl cyclohexanes;

(2) the polylactones known in polyurethane chemistry, such as the polymers of ε-caprolactone started on the above-mentioned dihydric alcohols;

(3) the polycarbonates known in polyurethane chemistry of the type which may be obtained by reacting the abovementioned diols, for example, with diaryl carbonates or phosgene;

(4) the polyethers known in polyurethane chemistry, such as the polymers and copolymers of styrene oxide, propylene oxide, tetrahydrofuran, butylene oxide or epichlorohydrin, produced with difunctional starter molecules, such as water, the above-mentioned diols or amines containing 2 N—H—bonds. It is also possible to use ethylene oxide, provided that the polyether used contains a maximum of about 10%, by weight, of ethylene oxide. In general, however, polyethers obtained without ethylene oxide are used;

(5) the polythioethers, polythio mixed ethers, and polythio ether esters known in polyurethane chemistry;

(6) the polyacetals known in polyurethane chemistry, for example, of the above-mentioned diols and formaldehyde; and (7) difunctional polyether esters containing terminal isocyanate-reactive groups.

Dihydroxy polyesters, dihydroxy polylactones, dihydroxy polyethers and dihydroxy polycarbonates, are preferably used in the process according to the present invention.

Basically, the compounds according to the present invention could also be produced without the use of relatively high molecular weight polyhydroxyl compounds, i.e. solely from diisocyanates and low molecular weight reactants (molecular weight < 300).

Chain extenders having a molecular weight below about 300 suitable for use in the process according to the present invention for producing the self-dispersible polyurethanes are, for example, the low molecular weight diols described in reference to the production of the dihydroxy polyesters or even diamines, such as diaminoethane, 1,6-diaminohexane, piperazine, 2,5-dimethyl piperazine, 1-amino-3-aminomethyl-3,5,5-trimethyl cyclohexane, 4,4'-diamino dicyclohexyl methane, 1,4-diamino cyclohexane, 1,2-propylene diamine or even hydrazine, amino acid hydrazides, hydrazides of semi-carbazido carboxylic acids, bis-hydrazides and bis-semi-carbazides.

In addition to the above-mentioned difunctional synthesis components (difunctional in the sense of the isocyanate polyaddition reaction), it is also possible in certain cases, i.e. where weak branching of the polyurethanes is required, to use small proportions of the trifunctional and more highly functional synthesis components known in polyurethane chemistry, such as triisocyanates as for example triphenylmethane triisocyanate or tris-(isocyanatohexyl)-biuret or trifunctional alcohols such as e.g. glycerol or trimethylolpropane.

It is possible in the process according to the present invention to use:

(a) any diisocyanates and/or difunctional compounds (difunctional in the sense of the isocyanate polyaddition reaction) having isocyanate-reactive hydrogen atoms and hydrophilic side chains containing ethylene oxide units, and (b) any monoisocyanates or diisocyanates and/or monofunctional or difunctional compounds (in the sense of the isocyanate polyaddition reaction) having isocyanate-reactive hydrogen atoms and ionic groups or groups convertible into ionic groups.

The preferred hydrophilic synthesis components having hydrophilic side chains containing ethylene oxide units include both compounds corresponding to the general formula:

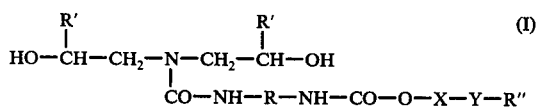
(I)

and/or compounds corresponding to the general formula:

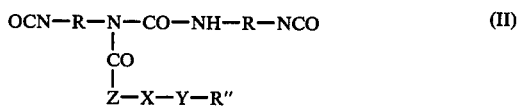
(II)

Particularly preferred synthesis components (a) are those corresponding to general formula (I).

In the general formulae (I) and (II) above,

R represents a difunctional radical of the type obtained by removing the isocyanate groups from a diisocyanate corresponding to the general formula R(NCO)$_2$ of the type mentioned above, R' represents hydrogen or a monofunctional hydrocarbon radical having from 1 to 8 carbon atoms, preferably hydrogen or a methyl group, R'' represents a monofunctional hydrocarbon radical having from 1 to 12 carbon atoms, preferably an unsubstituted alkyl radical having from 1 to 4 carbon atoms, X represents a difunctional radical obtained by removing the terminal oxygen atom from a polyalkylene oxide radical having from about 5 to 90 chain members, preferably from about 20 to 70 chain members, of which at least about 40% and preferably at least about 65% consists of ethylene oxide units and which, in addition to ethylene oxide units, may also contain propylene oxide, butylene oxide or styrene oxide units, of which propylene oxide units are preferred, Y represents oxygen or —NR'''—, wherein R''' has the same definition as R'', Z represents a radical which has the same definition as Y.

The compounds corresponding to general formulae (I) and (II) above may be produced by the methods according to DT-OS Nos. 2 314 512 and 2 314 513 and U.S. Pat. Nos. 3,920,598 and 3,905,929 said U.S. patent incorporated herein by reference. In addition to the disclosures of these two Offenlegungsschriften and the U.S. patent, it is pointed out that, instead of using the monofunctional polyether alcohols mentioned therein as starting materials, it is also possible to use those of the type whose polyether segment, in addition to ethylene oxide units, may also contain up to 60%, by weight, based on polyether segment, of propylene oxide, butylene oxide or styrene oxide units, preferably propylene oxide units. In certain cases, the presence of these "mixed polyether segments" may afford specific advantages.

Synthesis components (b) essential to the present invention are, for example, monofunctional or difunctional (monofunctional or difunctional in the sense of the isocyanate polyaddition reaction) compounds mentioned by way of example in column 4, line 11 through column 6, line 9 of U.S. Pat. No. 3,479,310, incorporated herein by reference, and the corresponding compounds containing salt-like groups obtainable by neutralization or quaternization. Suitable neutralizing or quaternizing agents are, for example, the compounds mentioned in column 6, lines 14 to 39 of the U.S. Pat. No. 3,479,310, incorporated herein by reference.

The compounds preferably used as synthesis components (b) in the process according to the present invention are aliphatic diols containing sulphonate groups of the type described in German Patent Application No. P 24 46 440.2 which corresponds to copending U.S. patent application Ser. No. 777,206, filed Mar. 14, 1977, which, in turn, is a continuation of U.S. patent application Ser. No. 614,730, filed Sept. 18, 1975, now abandoned, or diamino sulphonates corresponding to the following general formula:

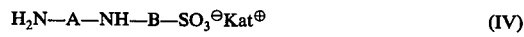
(IV)

wherein

A and B represent aliphatic hydrocarbon radicals having from 2 to 6 carbon atoms, preferably ethylene radicals, and Kat$^\oplus$ represents an optionally substituted ammonium cation or preferably a sodium or potassium cation.

In the process according to the present invention, the quantity and type of components (a) is selected in such a way that the polyurethanes according to the present invention contain from about 0.5 to 10%, by weight, and preferably from about 1.5 to 6%, by weight, of ethylene oxide units, —CH$_2$—CH$_2$—O—, incorporated into the alkylene oxide side chains. In the process according to the present invention, the quantity and type and degree of neutralization or quaternization of component (b) is selected in such a way that the polyurethanes according to the present invention contain from about 0.1 to 15 milliequivalents per 100 g and preferably from about 0.4 to 12 milliequivalents per 100 g of =N$^\oplus$=, —COO$^\ominus$ or —SO$_3$$^\ominus$-groups. The sum of the number of milliequivalents of ionic groups incorporated per 100 g of polyurethane plus the number of "pseudomilliequivalents" of lateral ethylene oxide units incorporated per 100 g of polyurethane preferably amounts to from about 5 to 30 and with particular preference to from about 8 to 25.

In the context of the present invention, a "pseudomilliequivalent" of laterally incorporated ethylene oxide units is the quantity of ethylene oxide units incorporated within a lateral polyalkylene oxide chain which makes the same contribution towards dispersibility of the polyurethane in water as one milliequivalent of the incorporated ionic groups. (The effectiveness of the above-mentioned ionic groups in regard to their contribution towards the dispersibility of the polyurethane is governed solely by the number of milliequivalents of ionic groups and not by the type of ionic groups.) In the aqueous polyurethane dispersions, the average particle diameter of the dispersed polyurethane particles is governed by the concentration of the incorporated hydrophilic centers in the polyurethane.

Thus, the average particle size generally increases with descreasing concentration of hydrophilic centers for otherwise the same structure of the polyurethane. Detailed studies conducted by the Applicants have shown that, in any water-dispersible, solely ionically-modified polyurethane, for otherwise exactly the same molecular structure, the ionic groups may always be replaced by a certain quantity of ethylene oxide arranged laterally within a polyether chain so that a corresponding, solely non-ionically modified polyurethane is obtained and, in water-dispersed form, has the same average particle size (given production of the polyurethane dispersion by a similar method) when the milliequivalents of ionic groups present in the ionically modified polyurethane is replaced by the same number of "pseudo-milliequivalents" of non-ionic groups. Thus, 0.5 g of ethylene oxide units laterally incorporated within a polyether chain corresponds to one milliequivalent of incorporated ionic groups. Accordingly, one "pseudo-milliequivalent" of non-ionic groups is 0.5 g of ethylene oxide units laterally incorporated within a polyether chain. Accordingly, an aqueous dispersion of a solely ionically-modified polyurethane containing 12 milliequivalents per 100 g of one of the abovementioned ionic groups contains, for example, dispersed polyurethane particles having the same average particle diameter as a structurally similar and similarly produced, solely non-ionically-modified polyurethane dispersion containing 6 g per 100 g of ethylene oxide laterally incorporated within a polyether chain.

The process according to the present invention for producing the self-dispersible polyurethanes may be carried out in accordance with the methods known in polyurethane chemistry both by the one-stage process and also by the two-stage process (prepolymer process).

For producing the self-dispersible polyurethanes, the reactants are used in an equivalent ratio of isocyanate groups to isocyanate-reactive groups of from about 0.8:1 to 2.5:1, preferably from about 0.95:1 to 1.5:1. The use of an NCO-excess naturally results in the formation of compounds containing NCO-groups which, when converted into an aqueous dispersion, react further with the water, accompanied by chain extension, to form the dispersed end product. Accordingly, the above-equivalent ratio embodies all the components involved in the synthesis of the polyurethanes according to the present invention, including the amino-group-containing chain extender optionally used in the form of aqueous solutions, but not the water used for dispersing the polyurethanes which reacts with any NCO-group—containing compounds present in the chain-extending reaction. In the context of the present invention, any sulphonic acid groups or carboxyl groups (component (b)) which may be present in the reaction mixture are not regarded as isocyanate-reactive groups in view of their sluggishness in reaction with respect to isocyanate groups.

Both the one-stage process and the two-stage process may be carried out in the presence or absence of solvents. Suitable solvents, especially if, as described below, it is intended to convert the polyurethanes into an aqueous dispersion during or after their production, are, for example, water-miscible solvents that are inert with respect to isocyanate groups and which boil at temperatures below about 100° C, such as acetone or methyl ethyl ketone.

For carrying out the one-stage process, the difunctional compounds containing terminal isocyanate-reactive groups and having molecular weights in the range of from about 300 to 6000, mentioned under (1) to (7) above, are mixed with the hydrophilic synthesis components (a) and (b) and with the chain extender used, if any, having a molecular weight below about 300. The diisocyanate component is then added to the mixture thus obtained in the absence of solvents, after which the reaction mixture is reacted, preferably at temperatures in the range of from about 50 to 150° C and optionally after the addition of catalysts known in polyurethane chemistry, such as for example tin-II-octoate or dibutyl-tindilaurate or tertiary amines such as triethylene diamine. The quantity in which the diisocyanate components are used is such that an NCO/OH ratio of from about 0.8 to 1.05 prevails. During the reaction, the viscosity of the reaction mixture increases so that one of the above-mentioned solvents is gradually added to the mixture. Finally, an organic solution of the fully reactive polyurethane is obtained, its concentration preferably being adjusted to from about 10 to 70%, by weight, and more especially to from about 15 to 55%, by weight, expressed as solids. In this one-stage process, it is particularly advisable to use dihydroxy sulphonates, dihydroxy sulphonic acid or tertiary amines with two alcoholic hydroxyl groups as component (b). In cases where compounds containing groups convertible into ionic groups are used as component (b), it is advisable to carry out conversion by neutralization or quaternization after the polyaddition reaction either in organic solution or in such a way that the polyurethane present in organic solution is neutralized during its conversion into an aqueous dispersion by neutralizing agents present in the water.

In that case, the dissolved polyurethane elastomers are best converted into an aqueous dispersion by adding water to the stirred solution. In many cases, the solution passes through the phase of a water-in-oil emulsion, after which it changes into an oil-in-water emulsion, simultaneously overcoming a viscosity maximum. Removal of the solvent by distillation leaves behind a pure, stable, aqueous dispersion.

For carrying out the two-stage process, an NCO-prepolymer is preferably initially prepared in the melt from excess diisocyanate, relatively high molecular weight compounds containing isocyanate-reactive groups of the type mentioned by way of example in (1) to (7) above and hydrophilic synthesis components (a) and optionally (b), maintaining an NCO/OH-ratio of about 1.1:1 to 3.5:1, preferably from about 1.2:1 to 2.5:1, in the absence of solvents or even in the presence of solvents. Where it is prepared in the absence of solvents, the NCO-prepolymer is subsequently dissolved, for example in a suitable solvent. The solution of the prepolymer thus obtained may then be reacted in known manner with the chain extending agent having a molecular weight below about 500 of the type exemplified above.

To prepare the polyurethane dispersions according to the present invention, it is particularly recommended to adopt a particular variant of the two stage process in which water or a water/solvent mixture is added in small quantities to the described solution of the NCO-prepolymer with the solution of the chain extender (in this case the above-mentioned diamines and hydrazine derivatives are preferably used as chain extenders) in such a way that the NCO/NH ratio is from about 2.5 to 1.05. This reaction may be carried out at room temperature or even, preferably, at temperatures of from about 25° to 60° C. By subsequently adding the rest of the water and removing the solvent, the polyurethane dispersion is finally obtained. However, it is also possible in this variant to the process to dissolve the chain extender in the total quantity of the water finally present in the dispersion (from about 50 to 200%, by weight, based on solid polyurethane). In carrying out the two-stage process, it is quite possible and often even preferred not to incorporate component (b) into the prepolymer, but instead to use aqueous solutions of diamino-carboxylates or diaminosulphonates, especially of the type corresponding to general formula (IV) above, instead of or in combination with the above-mentioned diamines and hydrazine derivatives for the chain extending reaction described above.

However, the two-stage process described above may also be carried out in the absence of solvents without any real difficulties by preparing the described NCO-prepolymer in solvent-free form and stirring it as a melt into the water. In this case, too, the above-mentioned ionic or nonionic hydrophilic components containing amino groups may be used in solution in the water.

In both embodiments of the process according to the present invention in which solvents are used, the above-defined sum of milliequivalents of ionic + "pseudo-milliequivalents" of non-ionic groups is in the range of from about 5 to 15 and preferably in the range of from about 8 to 15. Where the polyurethane dispersions are prepared in the absence of solvents by the two-stage process, this sum is in the range of from about 10 to 30 and preferably in the range of from about 10 to 25.

The water-dispersible polyurethane elastomers according to the present invention are of predominantly linear molecular structure and are characterized by a content of ethylene oxide incorporated laterally within the polyether chain of from about 0.5 to 10, preferably from about 1.5 to 6%, by weight, and a content of =N⊕=, —COO⊖ or —SO₃⊖-groups of from about 0.1 to 15, preferably from about 0.4 to 12 milliequivalents per 100 g. The lateral polyalkylene oxide chain which contains the ethylene oxide units essential to the present invention is preferably attached through groups:

(i) corresponding to the general formula:

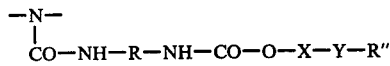

or (ii) corresponding to the general formula:

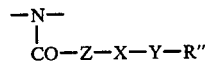

wherein R, R'', R''', X, Y and Z are as defined above in formulae (I) and (II).

The process according to the present invention as described above merely represents the preferred method, but by no means the only method of obtaining the polyurethanes according to the present invention.

Another method of obtaining the polyurethanes according to the present invention is, for example, to introduce the non-ionic lateral hydrophilic groups into a preferably linear polyurethane elastomer already containing ionic groups or groups convertible into ionic groups by reacting this elastomer with hydrophilic monoisocyanates corresponding to the following general formula:

wherein R, X, Y, R'' and R''' are as defined above.

Hydrophilic monoisocyanates of this type are produced in analogy to the process described in DT-OS No. 2,314,512, although it is pointed out in addition to the disclosure of that Offenlegungsschrift that, instead of using the mono-functional polyether alcohols mentioned there as starting materials, it is also possible to use those in which the polyether segment, in addition to ethylene oxide units, also contains up to about 60%, by weight, and preferably up to about 35%, by weight, based on polyether segment, of propylene oxide, butyl oxide or styrene oxide units, preferably propylene oxide units.

In cases where the polyurethanes according to the present invention are produced using these hydrophilic monoisocyanates, a linear polyurethane is preferably prepared from the above-mentioned starting materials using an equivalent ratio of isocyanate groups to isocyanate-reactive groups of preferably about 1:1, the linear polyurethane thus prepared containing ionic groups or groups convertible into ionic groups, but no hydrophilic polyether segments. This linear polyurethane elastomer is then reacted in the melt or in a suitable solvent, for example, of the type mentioned above, with the hydrophilic monoisocyanates at from about 50° to 150° C, producing an addition of the isocyanate group of the hydrophilic monoisocyanate to the active hydrogen atoms of the urethane and/or urea groups present in the linear polyurethane. Any groups convertible into ionic groups which may be present are subsequently converted at least partly into the corresponding ionic groups by neutralization or quaternization. In this embodiment of the production of the polyurethanes according to the present invention, it is important to ensure, in cases where carboxyl-group-containing synthesis components whose carboxyl groups are subsequently to be converted by neutralization into carboxylate groups are used, that the carboxyl-group-containing compounds used are those of the type whose carboxyl groups show a lower reactivity to isocyanate groups than urethane or urea groups.

The polyurethane according to the present invention thus obtained, either in the form of a melt or in the form of a solution, may then be converted into an aqueous dispersion by mixing with water and distilling off the auxiliary solvent used, if any.

Generally, the polyurethanes according to the present invention may be converted into aqueous dispersions by any methods including, for example, dispersion in the absence of solvents, for example, by mixing the polyurethane melt with water in an apparatus which is able to generate high shear gradients, and the use of very small quantities of solvent for plasticization during processing in the same apparatus, and also the use of non-mechanical dispersion aids, such as soundwaves of extremely high frequency. Finally, in the case of polyurethane ureas, too, chain extension may be carried out after the prepolymer has been converted into an aqueous emulsion. However, it is also possible to use simple mixers, for example, stirrer-equipped vessels or so-called "flow mixers", because the polyurethanes according to the present invention are self-dispersible.

The polyurethanes dispersed in accordance with the present invention have an average particle size of from about 10 m$\mu$ to 5 $\mu$, preferably from about 200 to 800 m$\mu$. Naturally, the optical dispersion or Tyndall effect begins to appear in the case of dispersions having particle sizes below about 500 m$\mu$. If the sum of milliequivalents of ionic groups and pseudo-milliequivalents of non-ionic groups is less than about 10, average particle diameters of from about 5 to approximately 50 $\mu$ may also be obtained. Dispersions of this type are of interest, for example, for the production of polyurethane powders.

The flow behavior of the dispersions, which it is not intended to discuss in detail here, is governed by particle size and concentration. In the case of relatively small particles, viscosity increases, in addition to which an increasingly higher flow limit occurs below a particle size of approximately 100 m$\mu$ (Bingham substance). Irrespective of this dependence, viscosity increases with increasing concentration which, with this class of dispersions, may amount to as much as about 70%, by weight, in some cases may be up to a level of 50 P.

Despite their ionic group content, the dispersions are largely unaffected by electrolytes. This provides, for example, for the acid-catalyzed crosslinking of the latex particles with formaldehyde or formaldehyde derivatives; similarly they may be pigmented with electrolyte-active pigments or dyes. Another property of the dispersions according to the present invention is the fact that they may be coagulated under the action of heat which makes them suitable for processing into films permeable to water vapor simply by heating.

The dispersions may be blended with other dispersions, for example, with polyvinyl acetate, polyethylene, polystyrene, polybutadiene, polyvinyl chloride, polyacrylate and copolymer plastics dispersions. The addition of known chemically non-fixed, preferably ionic, emulsifiers is also possible, but, of course, not essential.

Also, fillers, plasticizers, pigments, carbon black and silica sols, aluminum, clay and asbestos dispersions may also be incorporated into the dispersions.

The dispersions of the polyurethane compositions in water are generally stable, storable and transportable and may be processed at any later stage, for example, by forming. In general, they dry directly into dimensionally stable plastics coatings, although forming of the end products may also be carried out in the presence of known crosslinking agents. Polyurethanes having different properties may be obtained according to the chemical composition selected and to the urethane group content. Thus, it is possible to obtain soft tacky compositions and thermoplastic and elastomeric products having a variety of different hardnesses up to glass-hard duroplasts. The hydrophilicity of the products may also vary within certain limits. The elastic products may be thermoplastically processed at elevated temperatures, for example, at from about 100° to 180° C, providing they are not chemically crosslinked.

The end products of the process are suitable for coating and impregnating woven and non-woven textiles, leather, paper, wood, metals, ceramics, stone, concrete, bitumen, hard fibers, straw, glass, porcelain, plastics of a variety of different types, glass fibers, for antistatic and crease-resistant finishing, as binders for non-wovens, adhesives, adhesion promoters, laminating agents, hydrophobizing agents, plasticizers; binders, for example, for cork powder or sawdust; glass fibers, asbestos, paper-like materials, plastics or rubber waste, ceramic materials, as auxiliaries in textile printing and in the paper industry, as additives to polymers; as sizing agents, for example, for glass fibers; and for finishing leather.

The dispersions or pastes are preferably applied to a porous substrate which subsequently remains bonded to the end product, such as woven or non-woven textile structures and fiber mats, felts or non-wovens, also paper webs, foam sheeting or split leather which by virtue of their absorbing action cause the coating to harden immediately. This is followed by drying and, optionally, pressing at elevated temperature. However, drying may also be carried out on smooth porous or non-porous materials, for example, metal, glass, paper, cardboard, ceramic materials, sheet steel, silicone rubber, aluminum foil, the end sheet structure subsequently being lifted off and used as such or applied to a substrate using the reversal process by bonding, flame lamination or calendering. Application by the reversal process may be carried out at any time.

The properties of the end products may be modified by using vinyl polymers or active and inactive fillers. It is possible to use, for example, polyethylene, polypropylene, polyvinyl acetate, ethylene/vinyl acetate copolymers which may optionally be (partially) hydrolyzed and/or grafted with vinyl chloride, styrene-butadiene copolymers, ethylene (graft) copolymers, polyacrylates, carbon black, silica, asbestos, talcum, kaolin, titanium dioxide and glass in the form of powder or in the form of fibers or cellulose. Depending upon the required property spectrum and the application envisaged for the end products, up to about 70%, based on total dry substance, of these fillers may be present in the end product.

Dyes, pigments, plasticizers or additives which influence flow properties may, of course, also be added.

Drying of the products obtained by various application techniques may be carried out either at room temperature or at elevated temperature. The drying temperature to be selected in each individual case, which is governed not only by the chemical composition of the material, but above all by its moisture content, the drying time and the layer thickness, is readily determined by a preliminary test. For a given heating time, the drying temperature must always be below the solidification temperature.

The sheet structures may then be coated with a finish in order to increase their surface resistivity. Aqueous dispersions or solutions are again preferably used for this purpose.

Extremely hard polyurethanes obtained from finely divided dispersions and sols are suitable for use as stoving lacquers and, in some cases, even as air-drying lacquers. They combine extreme hardness and elasticity with high gloss and, in cases where aliphatic diisocyanates are used, favorable light stability and weather resistance.

The following Examples illustrate composition, production and some physical properties.

EXAMPLES

EXAMPLE 1

1632 parts of a polyester diol of 1,6-hexane diol, 2,2-dimethyl-1,3-propane diol and adipic acid having an OH-number of 63 is dehydrated at 100° C in a vacuum of about 14 Torr followed by the addition of a mixture of 244.2 parts of 3-isocyanatomethyl-3,5,5-trimethyl hexyl isocyanate and 185 parts of 1,6-hexane diisocyanate after the addition of 90 parts of a compound of equivalent parts (i) of a polyether monoalcohol of n-butanol, ethylene oxide and propylene oxide (in a molar ratio of 83:17) having an OH-number of 30, (ii) 1,6-hexane diisocyanate and (iii) diethanolamine. The mixture is stirred at 100° C until it has an NCO-content of 4.6%, by weight. 3200 parts of anhydrous acetone are added after cooling to from 50° to 60° C. A mixture of 107 parts of 3-aminomethyl-3,5,5-trimethyl cyclohexylamine, 13.3 parts of sodium (2-aminoethyl)-2-aminoethane sulphonate and 10 parts of hydrazine monohydrate dissolved in 260 parts of water is stirred slowly into this solution. After stirring for 10 minutes, 2280 parts of water are slowly introduced with vigorous stirring. A blueish-white dispersion of the solid in a mixture of water and acetone is formed. Removal of the acetone by distillation leaves an aqueous dispersion of the solid having a concentration of about 50%. Measurement of the particle diameter by the light scattering method gives a value of 200 ± 20 nm. The solids component of the dispersion contains about 3.1% of lateral polyethylene oxide segments and 3 milliequivalents of sulphonate groups ($-SO_3^\ominus$) per 100 g of solid.

EXAMPLE 2

(Comparison Example with DT-OS No. 2,314,512)

An aqueous polyurethane dispersion is prepared from the following starting materials in the same way as described in Example 1:

1581 parts of the polyester diol according to Example 1,
157.5 parts of the adduct of (i), (ii), and (iii) described in Example 1,
244 parts of 3-isocyanatomethyl-3,5,5-trimethyl cyclohexyl isocyanate,
185 parts of 1,6-hexane diisocyanate,
119 parts of 3-aminomethyl-3,5,5-trimethyl cyclohexylamine,
10 parts of hydrazine monohydrate,
2290 parts of water.

The dispersion has a solids content of about 50%. Determination of the particle diameter gives a value of 190 ± 20 nm. The solids component contains about 5.4% of polyethylene oxide segments.

EXAMPLE 3

(Comparison Example, PU-ionomer)

An aqueous dispersion is prepared from the following starting materials in the same way as described in Example 1:

1700 parts of the polyester diol according to Example 1,
302 parts of 1,6-hexane diisocyanate,
16.8 parts of 1,2-ethane diamine,
53.2 parts of sodium (2-aminoethyl)-2-aminoethane sulphonate,
3108 parts of water.

The dispersion has a solids content of about 40%. Determination of the particle diameter gives a value of 200 ± 20 nm. The solids component contains about 13.6 milliequivalents of sulphonate groups ($-SO_3^\ominus$) per 100 g of solids.

Samples of the dispersions of Examples 1, 2 and 3 were used in the following tests:

(1) 5 ml of a dispersion are poured into sealable 10 ml polyethylene vessels and stored for 6 hours in a refrigerator at −10° C. This operation is repeated three times at intervals of 24 hours. The stability of the dispersion is visually assessed after the last thaw.

(2) In a 250 ml stirrer-equipped vessel, 80 ml of dispersion are stirred at room temperature. A glass electrode connected to a pH-meter dips into the dispersion. A total of 80 ml of 0.1 n HCl-solution is slowly added dropwise from a burette. The pH-value falls. The pH-value at which coagulation of the solids begins and at which a clear serum is formed, is determined.

(3) In a 250 ml stirrer-equipped vessel, 100 ml samples of the dispersions are stirred for 10 hours at a constant speed at different thermostatically controlled temperatures. The stability and viscosity of the dispersions are assessed on completion of the tests.

Results:

|  | EXAMPLE 1 | EXAMPLE 2 | EXAMPLE 3 |
|---|---|---|---|
| TEST (1) | stable, no sediment, thinly liquid | stable, no sediment, thinly liquid | unstable, cheesy solid, thinly liquid serum (after 1 cycle) |
| TEST (2) | following addition of the total quantity: stable, thinly liquid | following addition of the total quantity: stable, thinly liquid | precipitation of a cheesy deposit at pH = 1.8 |
| TEST (3) |  |  |  |
| at 50° C | stable | increase in viscosity | stable |
| at 70° C | slight increase in viscosity | gelled | stable |
| at 90° C | appreciable increase in viscosity, but liquid | precipitation | stable |

EXAMPLE 4

(Comparison Example with U.S. Pat. No. 3,479,310)

An aqueous dispersion is prepared from the following starting materials in the same way as described in Example 1:

1360 parts of the polyester diol according to Example 1,
310 parts of a polyethylene oxide polyether diol having an OH-number of 72,
302 parts of 1,6-hexane diisocyanate,
51 parts of 3-aminomethyl-3,5,5-trimethyl cyclohexylamine,
49.4 parts of sodium (2-aminoethyl)-2-aminoethane sulphonate,
3109 parts of water.

The dispersion has a solids content of about 40%. The dispersion is clear, except for some slight opacity, and hardens into a jelly-like mass after standing for 3 weeks at room temperature. The dispersed polyurethane contains 15% by weight of ethylene oxide units and 12,5 milliequivalents of sulphonate groups per 100 g of solids.

EXAMPLE 5

(Comparison Example with U.S. Pat. No. 3,479,310)

An aqueous dispersion is prepared from the following starting materials in the same way as described in Example 1:
1530 parts of the polyester diol according to Example 1,
155 parts of the polyether diol according to Example 4,
302 parts of 1,6-hexane diisocyanate,
51 parts of 3-aminomethyl-3,5,5-trimethyl cyclohexylamine,
49.4 parts of sodium (2-aminoethyl)-2-aminoethane sulphonate,
3130 parts of water.

The dispersion has a solids content of about 40%. The dispersion has an opaque blueish color. After standing for 3 weeks, the solid settles out in the form of large flakes with a clouded thinly liquid serum on top. The solids component contains about 7.4% of polyethylene oxide segments and 12.5 milliequivalents of sulphonate groups ($-SO_3^\ominus$) per 100 g of solids.

EXAMPLE 6

(Comparison Example with U.S. Pat. No. 3,479,310)

An aqueous dispersion is prepared from the following starting materials in the same way as described in Example 1:
1615 parts of the polyester diol according to Example 1,
77.5 parts of the polyether diol according to Example 4,
302 parts of 1,6-diisocyanate,
85 parts of 3-aminomethyl-3,5,5-trimethyl cyclohexylamine,
11.4 parts of sodium (2-aminoethyl)-2-aminoethane sulphonate,
3136 parts of water.

The dispersion has a solids content of about 40%. The dispersion is white with blue tinges. After standing for three weeks, the solid is slowly deposited, and an opaque blueish serum forms over it. The solids component contains about 3.7% of polyethylene oxide segments and 2.3 milliequivalents of sulphonate groups ($—SO_3^\ominus$) per 100 g of solids.

EXAMPLE 7

An aqueous dispersion is prepared from the following starting materials in the same way as described in Example 1:
1632 parts of the polyester diol according to Example 1,
90 parts of the adduct of (i), (ii) and (iii) according to Example 1,
302 parts of 1,6-hexane diisocyanate,
85 parts of 3-aminomethyl-3,5,5-trimethyl cyclohexylamine,
11.4 parts of sodium (2-aminoethyl)-2-aminoethane sulphonate,
3180 parts of water.

The dispersion has a solids content of about 40%. It is blueish white and does not show any sediment after standing for 2 months.

The solids component contains about 3.35% of lateral polyethylene oxide segments and about 2.3 milliequivalents of sulphonate groups ($—SO_3^\ominus$) per 100 g of solid.

EXAMPLE 8

An aqueous dispersion is prepared from the following starting material in the same way as described in Example 1:
1632 parts of the polyester diol according to Example 1,
90 parts of the adduct of (i), (ii) and (iii) described in Example 1,
244 parts of 3-isocyanatomethyl-3,5,5-trimethyl cyclohexyl isocyanate,
185 parts of 1,6-hexane diisocyanate,
130 parts of 3-aminomethyl-3,5,5-trimethyl cyclohexylamine,
6.7 parts of sodium (2-aminoethyl)-2-aminoethane sulphonate,
10 parts of hydrazine monohydrate,
3447 parts of water.

The dispersion has a solids content of about 40%. The solids component of the dispersion contains about 3.1% of lateral polyethylene oxide segments and about 1.53 milliequivalents of sulphonate groups per 100 g of solid. The dispersion is thinly liquid and does not show any sediment after the tests described in Example 3.

EXAMPLE 9

An aqueous dispersion is prepared from the following starting materials in the same way as described in Example 1:
1666 parts of the polyester diol according to Example 1,
45 parts of the adduct of (i), (ii) and (iii) described in Example 1,
244 parts of 3-isocyanatomethyl-3,5,5-trimethyl cyclohexyl isocyanate,
185 parts of 1,6-hexane diisocyanate,
107 parts of 3-aminomethyl-3,5,5-trimethyl cyclohexylamine,
13.3 parts of sodium (2-aminoethyl)-2-aminoethane sulphonate,
10 parts of hydrazine monohydrate,
2270 parts of water.

The dispersion has a solids content of about 50%. The solids component of the dispersion contains about 1.57% of lateral polyethylene oxide segments and 3.05 milliequivalents of sulphonate groups per 100 g of solid. The dispersion is thinly liquid and stable after tests 2 and 3 described in Example 3. After test (1), about 5% of the solids component has deposited as sediment. However, it may be stirred up. Otherwise the dispersion is unchanged.

EXAMPLE 10

An aqueous dispersion is prepared from the following starting material in the same way as described in Example 1:
1666 parts of the polyester diol according to Example 1,
45 parts of the adduct of (i), (ii) and (iii) described in Example 1,
244 parts of 3-isocyanatomethyl-3,5,5-trimethyl cyclohexyl isocyanate,
185 parts of 1,6-hexane diisocyanate,
113.9 parts of 3-aminomethyl-3,5,5-trimethyl cyclohexylamine,
5.7 parts of sodium (2-aminoethyl)-2-aminoethane sulphonate,
10 parts of hydrazine monohydrate,
2270 parts of water.

The dispersion has a solids content of about 50%. The solids component of the dispersion contains 1.57% of polyethylene oxide segments and 1.32 milliequivalents of sulphonate groups per 100 g of solid. The dispersion is coarsely divided and after standing for 2 weeks shows a sediment which corresponds to about 20% of the total solids.

EXAMPLE 11

1595 parts of the polyester diol described in Example 1 are dehydrated at 100° C under a vacuum of about 14 Torr, followed by the addition of a mixture of 244 parts of 3-isocyanatomethyl-3,5,5-trimethyl cyclohexyl isocyanate and 185 parts of 1,6-hexane diisocyanate after the addition of 135 parts of the adduct of (i), (ii) and (iii) described in Example 1 and 8.3 parts of bis-(2-hydroxyethyl)methylamine. The mixture is stirred at 80° C until it has an NCO-content of 4.37%, by weight. After cooling to from 50 to 60° C, 3550 parts of anhydrous acetone are added. A solution of 107 parts of 1-amino-3,3,5-triamino-5-aminomethylcyclohexane in 220 parts of water is stirred slowly into this acetone solution. 10. parts of hydrazine monohydrate are then added in undiluted form. After stirring for 10 minutes, 8.3 parts of sulphuric acid dimethyl ester are stirred in. This is followed by stirring for another 15 minutes. 2075 parts of water are then introduced with vigorous stirring. A blueish-white dispersion of the solids in the mixture of water and acetone is formed. Removal of the acetone by distillation leaves an aqueous dispersion of the solids having a concentration of about 50%.

The solids component of the dispersion contains 4.6% of polyethylene oxide segments and 2.8 milliequivalents of quaternized nitrogen ($=N^{\oplus}=$) per 100 g of solids.

EXAMPLE 12

(A) 870 parts of 2,4-diisocyanatotoluene are added to 2000 parts of a polyether monoalcohol of n-butanol, ethylene oxide and propylene oxide (in a molar ratio of 75:25) having an OH-number of 28, followed by stirring for 3 hours at 60° C. 690 g of 2,4-diisocyanatotoluene are then removed by distillation under a vacuum of from 0.05 to 0.1 Torr, leaving a lightly viscous liquid having an NCO-content of 1.9%.

(B) 1598 parts of the polyester diol described in Example 1 are dehydrated at 100° C in a vacuum of 14 Torr and mixed with 25.2 parts of an adduct of 2-butene-1,4-diol, the equivalent quantity of sodium hydrogen sulphite and with 3.8 mols of propylene oxide. A mixture of 244 parts of 3-isocyanatomethyl-3,5,5-trimethyl cyclohexyl isocyanate and 185 parts of 1,6-hexane diisocyanate is then added to this mixture, followed by stirring at 100° C until an NCO-content of 4.9%, by weight, is obtained. The mixture is diluted with 500 parts of ethylene glycol monomethyl ether acetate. 119 parts of 3-amino-methyl-3,5,5-trimethyl cyclohexylamine are diluted with 70 parts of ethylene glycol monomethyl ether acetate, and added to the mixture with stirring at room temperature. The entire reaction mixture is heated to 130° C, followed by the addition of 90 parts of the isocyanate adduct described in section (A). After stirring for from 3 to 4 hours at the above-mentioned temperature, followed by cooling to about 35° C, 2830 parts of water are slowly added with vigorous stirring to the viscous liquid. A 40% dispersion of the solids in a mixture of water and ethylene glycol monomethyl ether acetate in a ratio of 83:17 is formed.

Even after standing for 3 weeks, the dispersion is a homogeneous liquid system without any sediment.

EXAMPLE 13

(A) The Example described below is carried out in the following test arrangement:

A type D 205 Supraton dispersion machine, consisting of a combination of a conical rotor in a correspondingly shaped stator, is used. A shear gradient of up to 10,000 sec.$^{-1}$ may be produced in the narrow zone between rotor and stator at rotor speeds of about 6000 rpm. At the tip of the cone, the stator has two concentric inlets, of which the inner is filled with the prepolymer described hereinafter through a calibrated pump and of which the outer is filled with water again through a calibrated pump. The outlet of the machine leads into a stirrer-equipped vessel with an overflow of which the dimensions are such that the average residence time amounts to a few minutes. The stirrer-equipped vessel, machine and feedpipes to the machine are adapted to be cooled or heated.

(B) 4030 parts of the polyester diol described in Example 1 are dehydrated at 100° C in a vacuum of 14 Torr. This is followed by the addition of 370 parts of a compound of equivalent parts (i) of a polyether monoalcohol of n-butanol and ethylene oxide having an OH-number of 28, (ii) 1,6-hexane diisocyanate and (iii) diethanolamine, 447 parts of the adduct of NaHSO$_3$ with 2-butene-1,4-diol described in Example 12 (B) and, finally, 1153 parts of 1,6-hexane diisocyanate. The mixture is stirred at 100° C until its NCO-content has fallen to 4.59%, by weight.

As described in (A), this prepolymer and water are introduced through the respective inlets in a ratio of 60:79 in such a way that the average residence time in the high shear gradient zone amounts to 10$^{-1}$ − 3 × 10$^{-1}$ sec. Heating of the feedpipes is regulated in such a way that the temperature of the prepolymer emulsion issuing from the dispersion machine does not exceed 55°–60° C. A solution of 438 parts of 3-aminomethyl-3,5,5-trimethyl cyclohexylamine and 18 parts of hydrazine monohydrate in 1784 parts of water is introduced into the prepolymer emulsion through another calibrated pump in a ratio of 64:10 before the emulsion is introduced into the stirrer-equipped vessel. The pH-value of the mixture, which may amount to from pH 9 to 10 on entry into the stirrer-equipped vessel, falls to from pH 7 to 7.5 in the vessel so that it is possible to run off from the overflow a substantially neutral 40% dispersion of a solid which does not show any sediment after standing for 3 weeks. The solid component of the dispersion contains 5.55% of polyethylene oxide segments and 14.7 milliequivalents of sulphonate groups per 100 g of solids.

EXAMPLE 14

1530 parts of the polyester diol according to Example 1 together with 263 parts of the polyethylene oxide diol according to Example 13 (B) are dehydrated at 120° C in a vacuum of 14 Torr, followed by cooling to 80° C. 106.4 parts of the adduct of NaHSO$_3$ with 2-butene-1,4-diol described in Example 12 (B) are then added, followed by thorough stirring. A mixture of 343 parts of 3-isocyanatomethyl-3,5,5-trimethyl cyclohexyl isocyanate and 260 parts of 1,6-hexane diisocyanate is then added, and the temperature increased to 90° C. After an NCO-content of 6.1% has been reached, the mixture is cooled to 50° C. 3645 parts of water are then slowly added with thorough stirring. After the entire prepolymer mixture has been converted into an aqueous emulsion a mixture of 199 parts of 3-aminomethyl-3,5,5-trimethyl cyclohexylamine and 8.5 parts of hydrazine monohydrate in 225 parts of water is added dropwise. The mixture is then slowly cooled to room temperature over a period of 3 hours. A finely divided, thinly liquid dispersion of the solids of about 40% is obtained. It does not show any sediment after standing for 3 weeks. The solids component contains 8.73% of polyethylene oxide segments and 9.9 milliequivalents of sulphonate groups per 100 g of solids.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Water-dispersible polyurethanes having a substantially linear molecular structure, characterized by:
   (a) lateral polyalkylene oxide polyether chains having a content of laterally incorporated ethylene oxide units sufficient to provided from about 0.5 to 10%, of the weight of the polyurethane as a whole, and,
   (b) a content of $=N^\oplus=$, $-COO^\ominus$ or $-SO_3^\ominus$ groups of from about 0.1 to 15 milliequivalents per 100 g.

2. Aqueous dispersions of the polyurethanes claimed in claim 1.

3. The water-dispersible polyurethanes of claim 1 wherein the content of laterally incorporated ethylene oxide units is sufficient to provide from about 1.5 to 6% of the weight of the polyurethane as a whole, and the content of ionic groups is from about 0.4 to 12 milliequivalents per 100 g.

4. The water dispersible polyurethane of claim 1 wherein the content of milliequivalents of ionic groups per 100 g of polyurethane plus the number of psuedo-milliequivalents of lateral ethylene oxide units per 100 g of polyurethane is from about 5 to 30.

5. A process for the production of a water-dispersible polyurethane having a substantially linear molecular structure comprising reacting
   (a) organic diisocyanates,
   (b) organic difunctional compounds having isocyanatereactive end groups and having a molecular weight of from about 300 to 6000, and
   (c) synthesis components containing hydrophilic groups or groups convertible into hydrophilic groups, said groups responsible for the dispersibility of the polyurethane,
so as to produce a polyurethane which contains from about 0.5 to 10% by weight of lateral ethylene oxide units, and from about 0.1 to 0.1 to 15 milliequivalents of ionic groups selected from the group consisting $=N^\oplus=$, $-COO^\ominus$ and $-SO_3^\ominus$ per 100 g of polyurethane.

6. The process of claim 5 wherein the synthesis components containing hydrophilic groups or groups convertible into hydrophilic groups are
   (i) compounds having hydrophilic side chains containing ethylene oxide units selected from the group consisting of diisocyanates and difunctional compounds having isocyanate-reactive hydrogen atoms, and
   (ii) compounds having ionic groups or groups convertible into ionic groups selected from the group consisting of monoisocyanates, diisocyanates, monofunctional compounds having isocyanate-reactive hydrogen atoms, and difunctional compounds having isocyanate-reactive hydrogen atoms.

7. The process of claim 6 wherein the component (i) hydrophilic component is selected from the group consisting of diols of the formula

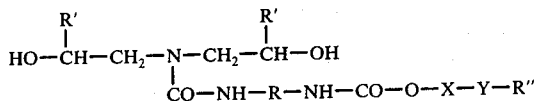

and the diisocyanates of the formula

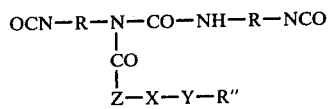

wherein:
R represents a difunctional radical of the type obtained by removing the isocyanate groups from a diisocyanate having a molecular weight of from about 112 to 1000,
R' represents hydrogen or a monofunctional hydrocarbon radical having from 1 to 8 carbon atoms,
X represents a difunctional radical obtained by removing the terminal oxygen atom from a polyalkylene oxide radical having from about 5 to 90 chain members of which at least about 40% consist of ethylene oxide units,
Y and Z represents oxygen or $-NR'''-$, and
R'' and R''', which may be the same or different, each represents a monofunctional hydrocarbon radical having from 1 to 12 carbon atoms.

8. The process of claim 7 wherein X represents a difunctional radical obtained by removing the terminal oxygen atom from a polyalkylene oxide radical having from about 5 to 90 chain members of which at least about 40% consist of ethylene oxide units and of which the remainder consists of alkylene oxide units selected from the group consisting of propylene oxide, butylene oxide and styrene oxide units.

9. The process of claim 6 wherein the component (ii) hydrophilic component is selected from the group consisting of aliphatic diols containing sulphonate groups and diamino sulphonates corresponding to the formula

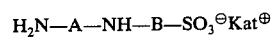

wherein
A and B represent aliphatic hydrocarbon radicals having from 2 to 6 carbon atoms, and
Kat$^\oplus$ represents an optionally substituted ammonium cation, a sodium cation or a potassium cation.

10. The process of claim 5 wherein the groups convertible into hydrophilic groups are at least partially converted into hydrophilic groups during or after the polyaddition reaction between components (a), (b) and (c).

11. The process of claim 5 wherein chain extenders having a molecular weight below about 300 are used.

12. The process of claim 5 wherein the reactants are used in an equivalent ratio of isocyanate groups to isocyanate-reactive groups of from about 0.8:1 to 2.5:1.

13. The process of claim 5 wherein the organic difunctional compounds having isocyanate-reactive end groups are selected from the group of compounds consisting of dihydroxy polyesters, dihydroxy polyactones, dihydroxy polyethers and dihydroxy polycarbonates.

14. The aqueous dispersions of claim 2 wherein the average particle size is from about 10 mμ to 5 μ.

15. The process of claim 7 wherein the component (i) hydrophilic component is a diol corresponding to the formula

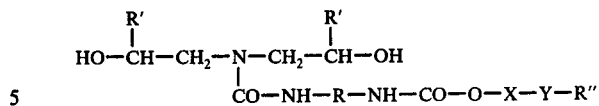

wherein
R, R', X, Y, R'' and R''' have the same meaning as in claim 10.

16. The process of claim 6 wherein the component (ii) hydrophilic component is selected from the group consisting of diols containing sulfonate groups and aliphatically bound hydroxyl groups, diamines containing aliphatically bound primary amino groups and diamines containing aliphatically bound secondary amino groups.

* * * * *